United States Patent
Frank et al.

(10) Patent No.: US 6,541,141 B1
(45) Date of Patent: Apr. 1, 2003

(54) WATER RECOVERY IN THE ANODE SIDE OF A PROTON EXCHANGE MEMBRANE FUEL CELL

(75) Inventors: David Frank, Scarborough (CA); Xuesong Chen, Brampton (CA)

(73) Assignee: Hydrogenics Corporation, Mississauga (CA)

( * ) Notice: Subject to any disclaimer, the term of this patent is extended or adjusted under 35 U.S.C. 154(b) by 185 days.

(21) Appl. No.: 09/592,643

(22) Filed: Jun. 13, 2000

(51) Int. Cl.⁷ .............................................. H01M 8/04
(52) U.S. Cl. ........................................... 429/17; 429/39
(58) Field of Search ............................ 429/17, 34, 38, 429/39

(56) References Cited

U.S. PATENT DOCUMENTS

| | | | | |
|---|---|---|---|---|
| 4,769,297 A | * | 9/1988 | Reiser et al. | 429/17 |
| 4,824,740 A | * | 4/1989 | Abrams et al. | 429/34 X |
| 5,441,821 A | * | 8/1995 | Merritt et al. | 429/17 |
| 6,013,385 A | * | 1/2000 | DuBose | 429/17 |
| 6,117,577 A | * | 9/2000 | Wilson | 429/17 |

FOREIGN PATENT DOCUMENTS

| | | | | |
|---|---|---|---|---|
| JP | 62-115671 | * | 11/1985 | H01M/8/04 |
| JP | 62-219471 | * | 9/1987 | H01M/8/04 |
| JP | 63-241872 | * | 10/1988 | H01M/8/04 |

* cited by examiner

*Primary Examiner*—Stephen Kalafut
(74) *Attorney, Agent, or Firm*—Bereskin & Parr

(57) ABSTRACT

A fuel cell has a proton exchange membrane. In known manner, the fuel cell includes inlets and outlets for flow of an oxidant and for flow of a fuel gas, commonly hydrogen. To deal with the issue of humidification, the invention provides a recirculation conduit including a pump connected between the anode inlet and the anode outlet. A water separator is provided in the recirculation conduit, for separating water from fuel gas exiting the anode. A main fuel inlet is connected to the recirculation conduit, for supply of fuel. A branch conduit can be provided, to enable purge cycles and other options to be provided.

15 Claims, 2 Drawing Sheets

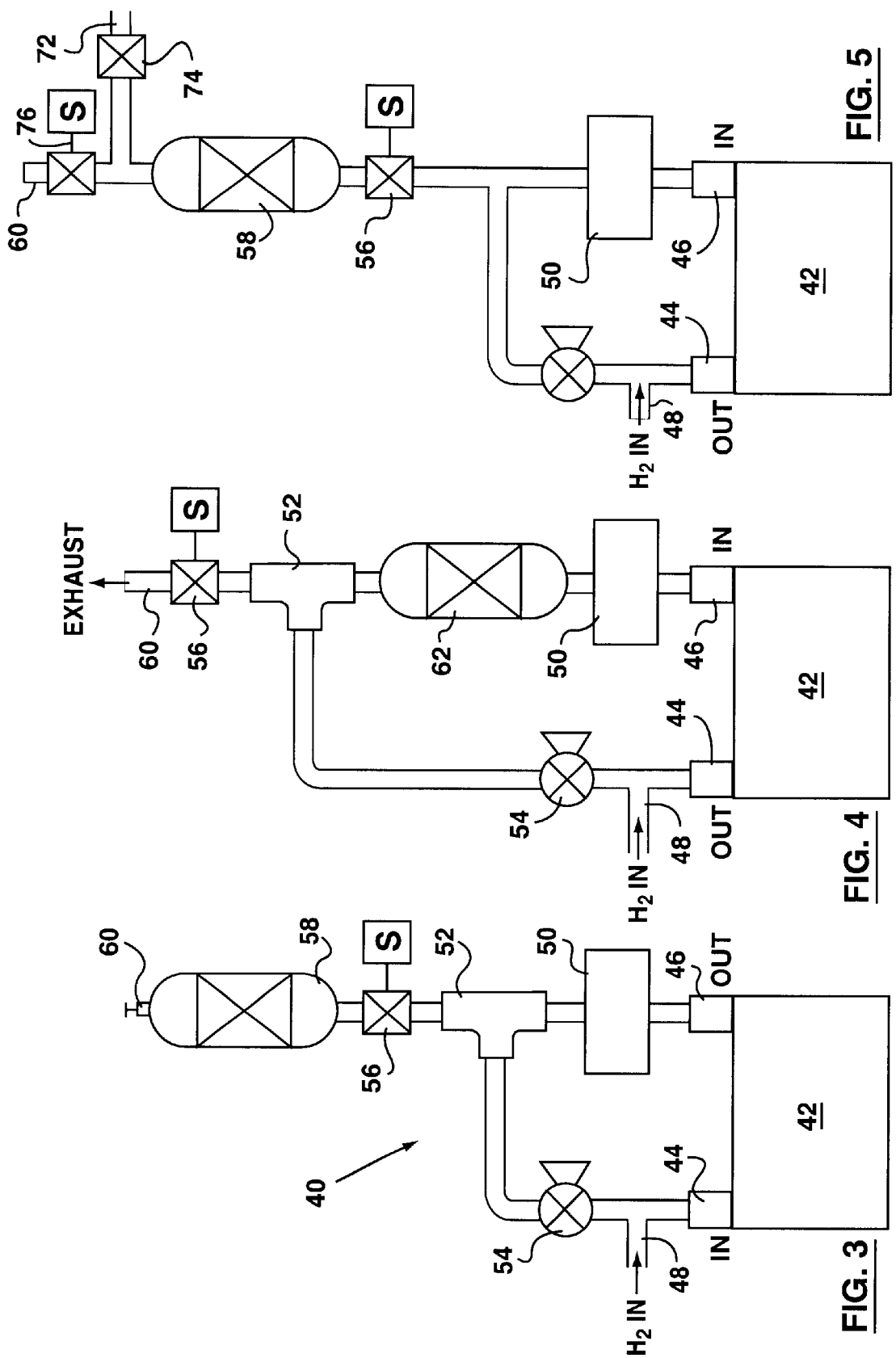

WATER RECOVERY IN THE ANODE SIDE OF A PROTON EXCHANGE MEMBRANE FUEL CELL

FIELD OF THE INVENTION

This invention relates to electrochemical fuel cells. More particularly, this invention relates to electrochemical fuel cells which employ hydrogen as a fuel and receive an oxidant to convert the hydrogen to electricity and heat, and which utilize a proton exchange membrane as the electrolyte.

BACKGROUND OF THE INVENTION

Generally, a fuel cell is a device which converts the energy of a chemical reaction into electricity. It differs from a battery in that the fuel cell can generate power as long as the fuel and oxidant are supplied.

A fuel cell produces an electromotive force by bringing the fuel and oxidant into contact with two suitable electrodes and an electrolyte. A fuel, such as hydrogen gas, for example, is introduced at a first electrode where it reacts electrochemically in the presence of the electrolyte and catalyst to produce electrons and cations in the first electrode. The electrons are circulated from the first electrode to a second electrode through an electrical circuit connected between the electrodes. Cations pass through the electrolyte to the second electrode. Simultaneously, an oxidant, typically air, oxygen enriched air or oxygen, is introduced to the second electrode where the oxidant reacts electrochemically in presence of the electrolyte and catalyst, producing anions and consuming the electrons circulated through the electrical circuit; the cations are consumed at the second electrode. The anions formed at the second electrode or cathode react with the cations to form a reaction product. The first electrode or anode may alternatively be referred to as a fuel or oxidizing electrode, and the second electrode may alternatively be referred to as an oxidant or reducing electrode. The half-cell reactions at the two electrodes are, respectively, as follows:

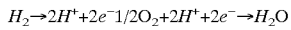

$$H_2 \rightarrow 2H^+ + 2e^- \quad 1/2O_2 + 2H^+ + 2e^- \rightarrow H_2O$$

The external electrical circuit withdraws electrical current and thus receives electrical power from the cell. The overall fuel cell reaction produces electrical energy which is the sum of the separate half-cell reactions written above. Water and heat are typical by-products of the reaction.

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a cooling medium. Also within the stack are current collectors, cell-to-cell seals and, insulation, with required piping and instrumentation provided externally of the fuel cell stack. The stack, housing, and associates hardware make up the fuel cell module.

Fuel cells may be classified by the type of electrolyte, either liquid or solid. The present invention is primarily concerned with fuel cells using a solid electrolyte, such as a proton exchange membrane (PEM). The PEM has to be kept moist with water because the available membranes will not operate efficiently when dry. Consequently, the membrane requires constant humidification during the operation of the fuel cell, normally by adding water to the reactant gases, usually hydrogen and air.

The proton exchange membrane used in a solid polymer fuel cell acts as the electrolyte as well as a barrier for preventing the mixing of the reactant gases. An example of a suitable membrane is a copolymeric perfluorocarbon material containing basic units of a fluorinated carbon chain and sulphonic acid groups. There may be variations in the molecular configurations of this membrane. Excellent performances are obtained using these membranes if the fuel cells are operated under fully hydrated, essentially water-saturated conditions. As such, the membrane must be continuously humidified, but at the same time the membrane must not be over humidified or flooded as this degrades performances. Furthermore, the temperature of the fuel cell stack must be kept above freezing in order to prevent freezing of the stack.

Cooling, humidification and pressurization requirements increase the cost and complexity of the fuel cell, reducing its commercial appeal as an alternative energy supply in many applications. Accordingly, advances in fuel cell research are enabling fuel cells to operate without reactant conditioning, and under air-breathing, atmospheric conditions while maintaining usable power output.

The current state-of-the-art in fuel cells, although increasingly focusing on simplified air-breathing, atmospheric designs, has not adequately addressed operations in sub-zero temperatures, which requires further complexity of the design. For instance, heat exchangers and thermal insulation are required, as are additional control protocols for startup, shut-down, and reactant humidifiers.

Where a solid polymer proton exchange membrane (PEM) is employed, this is generally disposed between two electrodes formed of porous, electrically conductive material. The electrodes are generally impregnated or coated with a hydrophobic polymer such as polytetrafluoroethylene. A catalyst is provided at each membrane/electrode interface, to catalyze the desired electrochemical reaction, with a finely divided catalyst typically being employed. The membrane electrode assembly is mounted between two electrically conductive plates, each which has at least one flow passage formed therein. The fluid flow conductive fuel plates are typically formed of graphite. The flow passages direct the fuel and oxidant to the respective electrodes, namely the anode on the fuel side and the cathode on the oxidant side. The electrodes are electrically coupled in an electric circuit, to provide a path for conducting electrons between the electrodes. In a manner that is conventional, electrical switching equipment and the like can be provided in the electric circuit. The fuel commonly used for such fuel cells is hydrogen, or hydrogen rich reformate from other fuels ("reformate" refers to a fuel derived by reforming a hydrocarbon fuel into a gaseous fuel comprising hydrogen and other gases). The oxidant on the cathode side can be provided from a variety of sources. For some applications, it is desirable to provide pure oxygen, in order to make a more compact fuel cell, reduce the size of flow passages, etc. However, it is common to provide air as the oxidant, as this is readily available and does not require any separate or bottled gas supply. Moreover, where space limitations are not an issue, e.g. stationary applications and the like, it is convenient to provide air at atmospheric pressure. In such cases, it is common to simply provide channels through the stack of fuel cell for flow of air as the oxidant, thereby greatly simplifying the overall structure of the fuel cell assembly. Rather than having to provide a separate circuit for oxidant, the fuel cell stack can be arranged simply to provide a vent, and possibly, some fan or the like to enhance air flow.

There are various applications for which humidification of fuel cells poses particular problems and challenges. For example, operation of fuel cells in mobile vehicles usually means that there is no readily available supply of water for humidifying incoming oxidant and fuel streams. It is usually undesirable to have to provide water to a vehicle for this purpose and also to have to carry the excess weight of the water around in the vehicle. In contrast, for stationary applications, providing a supply of water for humidification is usually quite possible.

However, there also some stationary applications for which humidification is not straightforward. For example, fuel cells are often used to provide power supplies to remote sensing equipment, in locations where water may not be readily available. Additionally, such remote use of fuel cells often occurs at locations with extreme climatic conditions. Thus, it has been known to use fuel cell stacks in the Antarctic regions and the like, for providing supply to scientific instruments. It is simply not realistic to provide a separate supply of water for humidification, because of the problems of preventing freezing of the water supply. Additionally, ambient air used as an oxidant is excessively dry, so that humidification is more critical than when using relatively moist air at more moderate temperatures. It will be appreciated that similar extreme conditions can be found in desert locations and the like.

SUMMARY OF THE INVENTION

Accordingly, the present invention is based on the realization that, as a fuel cell inherently produces excess moisture or water as a waste product, this water is available for recycling to humidify in coming flows to the fuel cell.

More particularly, the present inventors have realized that it is advantageous to recover water from the waste or outlet flows from a fuel cell or fuel cell stack, so as to avoid having to provide a separate water source to humidify the oxidant and/or fuel streams.

It has also been recognized that, in extreme climatic conditions, it is desirable, and even in some situations essential, that the humidity of discharged fuel and/or oxidant streams be below certain levels. For example, in extremely cold conditions, if the discharge streams contain significant moisture levels, then this moisture can immediately freeze. In practice, this will form a mist or fog or fine droplets or ice pellets, which would tend to build up on the outside of the apparatus. It will be appreciated that, for a stationary installation intended to provide power supplies to scientific instruments over a long period of time, such a possibility is highly undesirable, and could lead to blockage of vents, undesirable loading due to build-up of ice and other problems. For these reasons, it is desirable that discharged streams contain reduced levels of moisture.

In accordance with one aspect of the present invention, there is provided a fuel cell comprising an anode, an anode inlet for a fuel gas and an anode outlet; a cathode, a cathode inlet for an oxidant and a cathode outlet; and an electrolyte between the anode and the cathode; a recirculation conduit including a pump and connected between the anode inlet and the anode outlet; and a water separator provided in the recirculation conduit for separating water from the fuel gas exiting the anode; a first fuel inlet connected to the recirculation conduit, for supply of the fuel gas; and a branch conduit connected to the recirculation conduit and a dryer in the branch conduit, the branch conduit including a vent outlet.

A further aspect of the present invention provides a fuel cell comprising an anode, an anode inlet for a fuel gas and an anode outlet; a cathode, a cathode inlet for an oxidant and a cathode outlet; and an electrolyte between the anode and the cathodes a recirculation conduit including a pump and connected between the anode inlet and the anode outlet; and a water separator provided in the recirculation conduit for separating water from the fuel gas exiting the anode; a first fuel inlet connected to the recirculation conduit, for supply of the fuel gas; and a dryer in the recirculation conduit, downstream from the water separator.

In accordance with another aspect of the present invention, there is provided a method of recovering moisture from a fuel stream for a fuel cell comprising an anode, an anode inlet for a fuel gas and an anode outlet; a cathode, a cathode inlet for an oxidant and a cathode outlet; and an electrolyte between the anode and the cathode; and a first fuel inlet, for supply of the fuel gas, the method comprising:

(i) providing a recirculation conduit between the anode inlet and the anode outlet, to form a recirculation circuit, and providing the first fuel inlet connected to the recirculation circuit;

(ii) circulating the fuel gas through the recirculation circuit and through the anode;

(iii) continuously supplying additional fuel gas to the recirculation circuit, to make up for the fuel gas consumed in the fuel cell;

(iv) passing the fuel gas flow in the recirculation conduit through a water separator, to separate out water generated in the fuel cell; and (v) providing a branch conduit connected to the recirculation conduit, a dryer in the branch conduit and a vent outlet connected to the branch conduit, and periodically venting the fuel gas out through the branch conduit and the vent outlet, to purge accumulated and unwanted gases from the anode.

BRIEF DESCRIPTION OF THE DRAWING FIGURES

For a better understanding of the present invention and to show more clearly how it may be carried into effect, reference will now be made, by way of example, to the accompanying drawings which show preferred embodiments of the present invention and in which:

FIG. 3 is a first embodiment of an apparatus for recovering and recycling water on the anode side of a fuel cell stack;

FIG. 4 is a second embodiment of an apparatus for recovering and recycling water on the anode side of a fuel cell stack; and FIG. 5 is a third embodiment of an apparatus for recovering and recycling water on the anode side of a fuel cell stack.

DETAILED DESCRIPTION OF THE PREFERRED EMBODIMENTS

Figure 2:
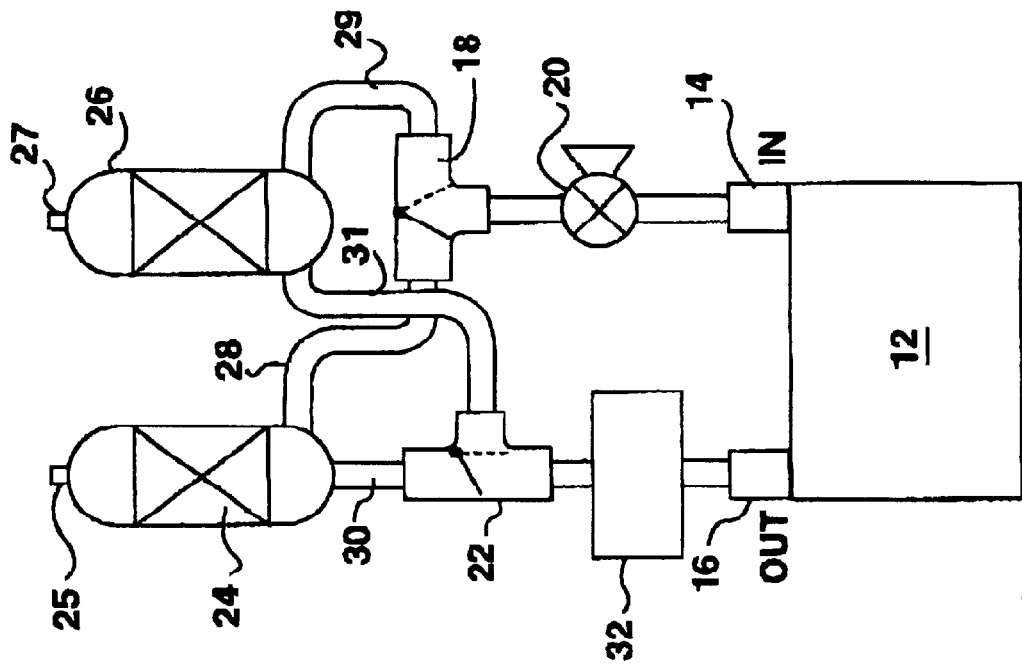
FIG. 2 is a second embodiment of an apparatus for recovering and recycling water on the cathode side of a fuel cell stack.
Figure 1:
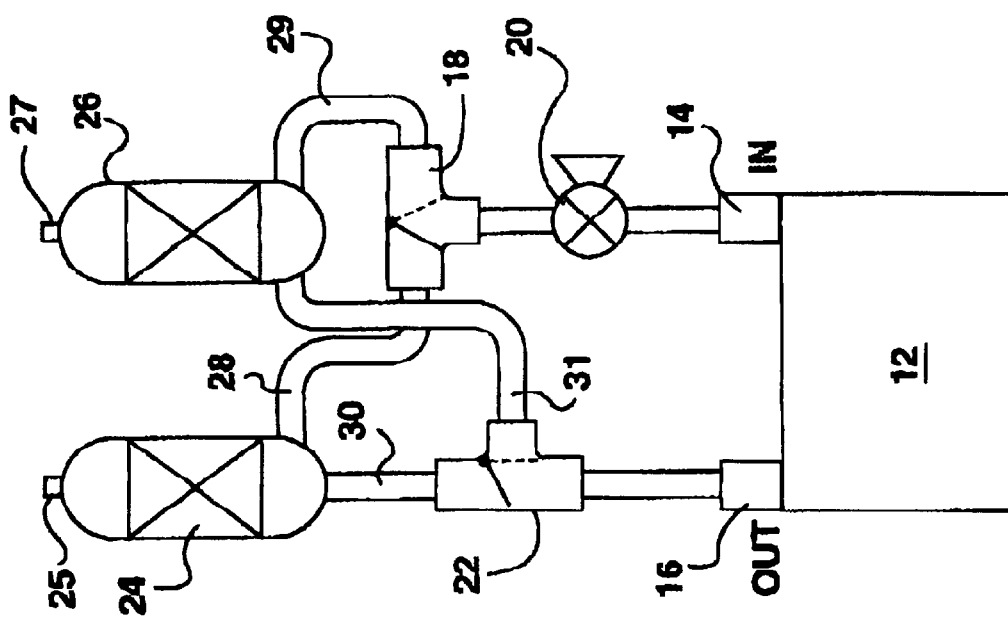
FIG. 1 is a schematic view of a first embodiment of an apparatus for recovering and recycling water on the cathode side of a fuel cell stack.

FIGS. 1 and 2 show the embodiments of an apparatus for recovering moisture from the cathode side of a fuel cell or fuel cell stack. This invention is claimed in our co-pending application Ser. No. 09/592,644 filed simultaneously here-with under the title, "Water Recovery, Primarily in the Cathode Side, of a Proton Exchange Membrane Fuel Cell" now U.S. Pat. No. 6,436,563.

Referring first to FIG. 1, a first embodiment of the apparatus as indicated generally by the reference 10. The apparatus 10 includes a fuel cell stack 12, although it will be appreciated that the fuel cell stack 12 could comprise just a single fuel cell. In known manner, the fuel cell stack has inlets and outlets for both fuel and an oxidant. In FIG. 1, just an inlet 14 and an outlet 16 are shown for the oxidant. Commonly, the oxidant is air, although for certain applications it can be pure oxygen.

A first or inlet 3-way valve 18 has a common port, connected by a pump 20 to the inlet 14. Correspondingly, the outlet 16 is connected to the common port of a second or outlet three-way valve 22. The pump 20 and the outlet 16 are connected to respective common ports of the first and second three-way valves 18, 22.

First and second dryers 24 and 26 are provided, each including a respective external port 25, 27.

The dryers 24, 26 are also connected by first and second inlet ducts 28, 29 to first and second branch ports of the first three-way valve 18. First and second outlet ducts 30, 31 connect first and second branch ports of the second three-way valve 22 to each of the dryers 24, 26 in the same manner.

Three-way valves 18, 22 are ganged together, so as to operate together in a manner detailed below. Generally, this ensures that while inlet flow through the pump 20 passes through one of the dryers 24, 26, outlet flow from the outlet 16 flows through the other of the dryers 24, 26.

In more detail, in a first mode of operation, the first three-way valve 18 is switched to connect its first branch port to the first dryer 24. Consequently, the pump draws ambient air through the external port 25 into the dryer 24. The dryer 24 will previously have been, in effect, charged with moisture from the previous cycle, so that incoming air picks up moisture and is humidified during passage through the dryer 24. The humidified air then passes through the first branch port of the valve 18 and through the pump 20 to the stack oxidant inlet 14. Simultaneously, the second three-way valve 22 is switched to connect its common port to the second branch port thereof, and hence through to the second dryer 26. Consequently, warm and humidified air discharged from the oxidant outlet 16 passes through the second dryer 26. This dries and dehumidifies the air, and simultaneously charges the second dryer 26 with moisture.

After a predetermined time period, determined by the capacities of the dryers 24, 26, the three-way valves 18, 22 are switched. Thus, in the next cycle or second mode, incoming air passes through the second dryer 26 to pick up moisture. Simultaneously, the first dryer 24, which will have given up retained moisture during the previous cycle, then has moist outgoing air from the outlet 16 passed through it, to recharge the first dryer 24 with moisture.

These cycles are alternated, in accordance with the capacities of the dryers 24, 26, to cause two main effects. Firstly, this ensures that the incoming air stream is humidified at a reasonably constant level. Correspondingly, the exhausted air stream is dehumidified. This has particular advantage in cold climates. It ensures that moisture in air discharged from the external ports 25, 27 of the dryers will not tend to immediately form frost or ice, which, over a period of time, can tend to build up and possibly block the ports in the apparatus.

Referring to FIG. 2, this shows a second embodiment of the apparatus. In this second embodiment, many components are similar to the first embodiment, and for simplicity and brevity, a description of these components is not repeated. Rather, these components are given the same reference numerals, and it will be understood that they function in the same manner as for the first embodiment.

The sole additional element in this second embodiment is the provision of a water separator 32. This is provided in the outlet flow between the oxidant outlet 16 and the second three-way valve 22. The effect of this is to prolong the drying time for each of the dryers 24, 26. The separator 32 separates out water droplets and the like, using any known technique. This recovered water can, separately, be used for humidification of the incoming oxidant and/or fuel streams for the fuel cell stack.

As mentioned, another advantage is that the moisture load on the dryers is reduced, thereby enabling longer cycles to be used.

Reference will now be made to FIGS. 3, 4 and 5, which show three separate embodiments of an apparatus for effecting drying of the fuel stream in a fuel cell stack. In particular, this technique is particularly intended for a fuel stream comprising hydrogen, although it will be recognized by those skilled in the art that this technique has applicability to a wide range of other fuels. An example of another fuel is a hydrogen rich reformate fuel, i.e. a fuel produced by reforming a hydrocarbon fuel, to produce a gas mixture rich in hydrogen.

Referring to FIG. 3, a first embodiment of the apparatus for drying the anode flow is indicated generally by the reference 40. It again includes a fuel cell stack indicated generally at 42, and corresponding to the cathode of the stack, a fuel inlet 44 and a fuel outlet 46 are provided. A main hydrogen or fuel inlet 48 is provided immediately upstream from the stack fuel inlet 44.

The outlet 46 is connected to a water separator 50 and then to a T-connector 52. One branch of the T-connector 52 is connected through a pump 54 back to the fuel inlet 44.

The other branch of the T-connector 52 is connected through a shut-off valve 56 and then through a dryer 58 to a vent port 60.

In a normal mode of operation, the shut-off valve 56 is closed, and the pump 54 actuated to cycle hydrogen through the stack 42.

As is known, a common problem with fuel cells is that nitrogen tends to diffuse across the membrane from the cathode side to the anode side and consequently, after a period of time, nitrogen tends to build up on the anode or hydrogen side of the stack. Additionally, there can be a problem with build-up and moisture on the membrane.

For these two reasons, periodically, for example every 5 minutes, the anode side can be purged. For this purpose, a shut-off valve 56 is opened for a short period, for example 5 seconds, to vent gas through the dryer 58 to the vent port 60. Typically, the anode side is operated at a slight positive pressure. Opening the valve 56 causes the pressure pulse to pass through the stack, which can have the effect of causing the water to "jump out of" pores of the electrodes and gas diffusion media. In any effect, whatever the exact mechanism, it has been found that an abrupt and sharp purge cycle tends to promote venting of excess moisture, in addition to built up and unwanted gases.

At the end of the 5 second purge cycle, the valve 56 is closed again.

The dryer 58 serves to ensure that gas vented through the vent port 60 has a low level of humidity. This can be desirable in certain circumstances. In particular, in cold climates, this ensures that there is no problem with moisture and the vented gas tending to form frost and ice particles and build up on or around the apparatus.

The dryer 58 can be replaced at suitable intervals, e.g. when replacing the fuel that supplies the hydrogen, where hydrogen is supplied from a cylinder. Alternatively, it may be possible to provide some variant configuration in which incoming fuel is passed through the dryer 58 to pick up moisture accumulated therein.

In FIGS. 4 and 5, components common to FIG. 3 are given the same reference numerals. For the reasons given above, a description of these components is not repeated, for simplicity and brevity.

Thus, in FIG. 4, a dryer 62 is provided between the separator 50 and the T-connector 52. The shut-off valve 56 is then provided immediately above the T-connector 52 as before, but here is connected directly to a vent port 60.

FIG. 4 functions, in use, in effect, to maintain a desired humidity level within the anode side of the fuel cell stack 42. Thus, excess moisture can be separated in the separator 50, but it is anticipated that the dryer 62 will run in an essentially saturated condition, so as to maintain humidity at a desired level.

Again, as for FIG. 4, the shut-off valve 56 can be opened periodically, e.g. every 5 minutes for purge cycle of, for example, 5 seconds. This again prevents build up of nitrogen in the anode side of the stack. To the extent that water is removed from the fuel cell from the purge cycle, this water would be either separated by the separator 50, in the case of water droplets, or otherwise absorbed by the dryer 62.

To the extent that dryer 62 is used to maintain a constant humidity level, it should not be necessary to exchange the dryer at any time. However, it may be desirable to replace the dryer from time to time, as contaminants may tend to build up in the dryer 62.

Finally, with reference to FIG. 5, the third embodiment of the anode aspect of the invention includes all the elements of FIG. 3. It additionally includes a second hydrogen inlet 72, a hydrogen control valve 74 and a second shut-off valve 76.

In normal use, this third embodiment functions in much the same manner as the first embodiment of FIG. 4. Thus, hydrogen is usually supplied through the main fuel inlet 48. The pump 54 is run, to cycle hydrogen continuously through the separator 50.

Theoretically, again for example every 5 minutes, a short purge cycle (again, for example 5 seconds) can be effected by opening the shut-off valve 56. Simultaneously, the second shut-off valve 76 is opened. This again permits gas to vent from the anode side of the stack through the dryer 58 to the vent port 60.

Now, when moisture builds up in the dryer 58, periodically the supplied hydrogen is switched from the main fuel inlet 48 to the second hydrogen inlet 72. For this purpose, a valve (not shown) will be closed to close off the main fuel inlet 48. Simultaneously, the hydrogen control valve 74 would be opened. The second shut-off valve 76 would remain closed and the first shut-off valve 56 opened. This permits supply of hydrogen from the second hydrogen inlet 72 through the dryer 58 towards the anode side of the stack 42.

The pump 54 would be run as before. Consequently, hydrogen will be cycled through the stack and the water separator 50. As hydrogen is consumed, fresh hydrogen will be supplied from the inlet 72, and this hydrogen would be humidified in the dryer 58 thereby serving to remove moisture from the dryer 58 and recharge the dryer.

After a suitable period of time, the hydrogen control valve 74 will be closed arid hydrogen supply would be recommenced through the main hydrogen or fuel inlet 48. The dryer 58 would then be in a dried or recharge condition, ready to recover moisture from gas during the purge cycle.

The advantage of this embodiment, as compared to that of FIG. 4, is that it recovers moisture and uses it to add humidity to incoming hydrogen. At the same time, it does not require replacement of the dryer, to effect recharging of the dryer.

While the invention has been described in relation to both humidification on the cathode side and the anode side, this invention is primarily concerned with humidification on the anode side.

Where humidification is provided just on the anode side, it is recognized that, in use, water is generated primarily on the cathode side, due to proton migration through the membrane. For this reason, water recovery from the cathode side can be optimal. Nonetheless, depending on the operating conditions, significant moisture can be generated or occur on the anode side. For example, if the oxidant side is maintained at a significantly higher pressure than the anode or fuel side, then water generated during reaction can be caused to flow back through the membrane, so that a significant quantity of water appears on the anode side and so that the exhausted anode fuel stream is significantly humidified. In such cases, recovering or controlling moisture in the exhausted fuel stream is desirable.

What is claimed is:

1. A fuel cell comprising an anode, an anode inlet for a fuel gas and an anode outlet; a cathode, a cathode inlet for an oxidant and a cathode outlet; and an electrolyte between the anode and the cathode; a recirculation conduit including a pump and connected between the anode inlet and the anode outlet; and a water separator provided in the recirculation conduit for separating water from the fuel gas exiting the anode; a first fuel inlet connected to the recirculation conduit, for supply of the fuel gas; and a branch conduit connected to the recirculation conduit and a dryer in the branch conduit, the branch conduit including a vent outlet.

2. A fuel cell as claimed in claim 1, which includes a first shut-off valve in the branch conduit, upstream of the dryer for controlling flow of the fuel gas to the dryer, and the first shut-off valve being operable to effect purge cycles, in use, to purge accumulated and unwanted gases from the anode.

3. A fuel cell comprising an anode, an anode inlet for a fuel gas and an anode outlet; a cathode, a cathode inlet for an oxidant and a cathode outlet; and an electrolyte between the anode and the cathode; a recirculation conduit including a pump and connected between the anode inlet and the anode outlet; and a water separator provided in the recirculation conduit for separating water from the fuel gas exiting the anode; a first fuel inlet connected to the recirculation conduit, for supply of the fuel gas; and a dryer in the recirculation conduit, downstream from the water separator.

4. A fuel cell as claimed in claim 3, which includes a branch conduit connected to the recirculation conduit, downstream from the dryer and including a first shut-off valve, for effecting purge cycles, and a vent outlet connected to the branch conduit.

5. A fuel cell as claimed in claim 1 or 4, wherein the branch conduit is connected to the recirculation conduit upstream from the pump.

6. A fuel cell as claimed in claim 1 or 4, which includes a second fuel inlet connected to the branch conduit between the dryer and the vent outlet, and a second shut-off valve in the branch conduit between the second fuel inlet and the vent outlet, for effecting reverse flow of the fuel gas through the dryer to re-activate the dryer and to recover moisture therefrom.

7. A fuel cell as claimed in claim 6, which includes a fuel control valve in the second fuel inlet, for control thereof.

8. A method of recovering moisture from a fuel stream for a fuel cell comprising an anode, an anode inlet for a fuel gas and an anode outlet; a cathode, a cathode inlet for an oxidant and a cathode outlet; and an electrolyte between the anode and the cathode; and a first fuel inlet, for supply of the fuel gas, the method comprising:

(i) providing a recirculation conduit between the anode inlet and the anode outlet, to form a recirculation circuit, and providing the first fuel inlet connected to the recirculation circuit;

(ii) circulating the fuel gas through the recirculation circuit and through the anode;

(iii) continuously supplying additional fuel gas to the recirculation circuit, to make up for the fuel gas consumed in the fuel cell;

(iv) passing the fuel gas flow in the recirculation conduit through a water separator, to separate out water generated in the fuel cell; and (v) providing a branch conduit connected to the recirculation conduit, a dryer in the branch conduit and a vent outlet connected to the branch conduit, and periodically venting the fuel gas out through the branch conduit and the vent outlet, to purge accumulated and unwanted gases from the anode.

9. A fuel cell as claimed in claim 1, 2, 3 or 4, wherein the water separator is provided in the recirculation conduit between the anode outlet and the pump.

10. A fuel cell as claimed in claim 1, 2, 3 or 4, wherein the electrolyte of the fuel cell comprises a proton exchange membrane provided with catalysts at interfaces with the anode and the cathode.

11. A fuel cell as claimed in claim 1, 2, 3 or 4, wherein the fuel cell includes a plurality of fuel cells formed as a fuel cell stack.

12. A method as claimed in claim 8, which includes the following additional step:

(vi) providing a first shut-off valve in the branch conduit, upstream of the dryer for controlling flow of the fuel gas to the dryer, and operating the shut-off valve to effect purge cycles, to purge accumulated and unwanted gases from the anode.

13. A method of recovering moisture from a fuel stream for a fuel cell comprising an anode, an anode inlet for a fuel gas and an anode outlet; a cathode, a cathode inlet for an oxidant and a cathode outlet; and an electrolyte between the anode and the cathode; and a first fuel inlet, for supply of the fuel gas, the method comprising:

(i) providing a recirculation conduit between the anode inlet and the anode outlet, to form a recirculation circuit, and providing the first fuel inlet connected to the recirculation circuit;

(ii) circulating the fuel gas through the recirculation circuit and through the anode;

(iii) continuously supplying additional fuel gas to the recirculation circuit, to make up for the fuel gas consumed in the fuel cell;

(iv) passing the fuel gas flow in the recirculation conduit through a water separator, to separate out water generated in the fuel cell;

(v) providing a branch conduit connected to the recirculation conduit, a dryer in the branch conduit and a vent outlet connected to the branch conduit, and periodically venting the fuel gas out through the branch conduit and the vent outlet, to purge accumulated and unwanted gases from the anode;

(vi) providing a dryer in the recirculation conduit, downstream from the water separator and drying the fuel gas in the dryer; and (vii) providing a first shut-off valve in the branch conduit and operating the first shut-off valve to effect purge cycles, to purge accumulated and unwanted gases from the anode.

14. A method as claimed in claim 8, 12 or 13, which includes connecting the branch conduit to the recirculation conduit upstream from the pump.

15. A method as claimed in claim 8, 12 or 13, which includes providing a second fuel inlet connected to the branch conduit between the dryer and the vent outlet and a second shut-off valve in the branch conduit between the second fuel inlet and the vent outlet and a fuel control valve in the second fuel inlet, and periodically opening the fuel control valve and supplying a reverse flow of fuel gas through the dryer to reactivate the dryer and to recover moisture therefrom.

* * * * *